United States Patent

[11] 3,587,884

| [72] | Inventor | Philip R. Adrian<br>Escalon, Calif. |
|---|---|---|
| [21] | Appl. No. | 820,893 |
| [22] | Filed | May 1, 1969 |
| [45] | Patented | June 28, 1971 |
| [73] | Assignee | Fruit Harvesting Co., Inc.<br>Escalon, Calif. |

[54] CRATE-HOLDER
3 Claims, 6 Drawing Figs.

[52] U.S. Cl. .................................................. 214/83.24,
214/518, 214/151
[51] Int. Cl. .................................................... B60p 3/00
[50] Field of Search .......................................... 214/151,
80, 380, 671, 730, 654, 83.24

[56] References Cited
UNITED STATES PATENTS
2,476,539  7/1949  Fortin ........................... 214/380

| 2,823,813 | 2/1958 | Shimmon .................... | 214/671X |
| 3,199,699 | 8/1965 | Dayton ...................... | 214/654 |
| 3,260,547 | 7/1966 | Heilig et al. ................ | 298/17X |
| 3,455,476 | 7/1969 | Grigsby ..................... | 214/654X |

*Primary Examiner* — Albert J. Makay
*Attorney* — Mellin, Moore & Weissenberger

ABSTRACT: A crate is carried on a pivotable support frame attached to a harvesting machine, while another crate mounted on the harvesting machine receives fruit or the like being harvested thereby. Means are included for selectively holding the first-mentioned crate on the support frame and out of the way of the second-mentioned crate. When the second-mentioned crate is filled, it is released from the harvesting machine and the first-mentioned crate is swung into the position it formerly occupied.

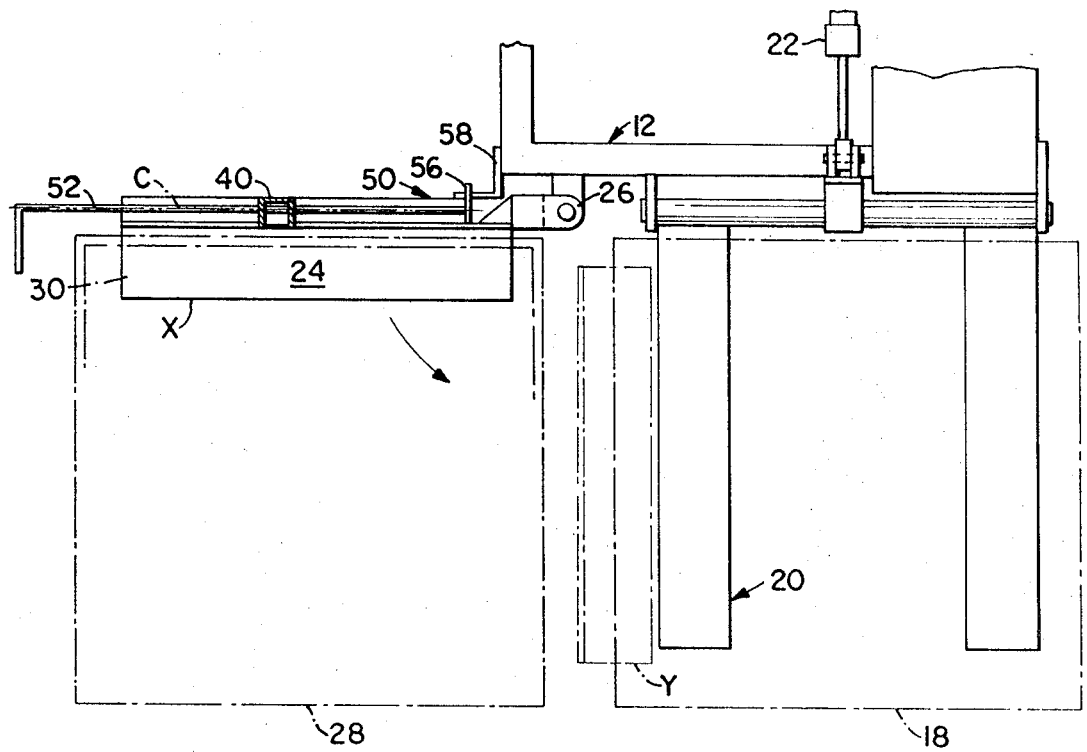
FIG_2
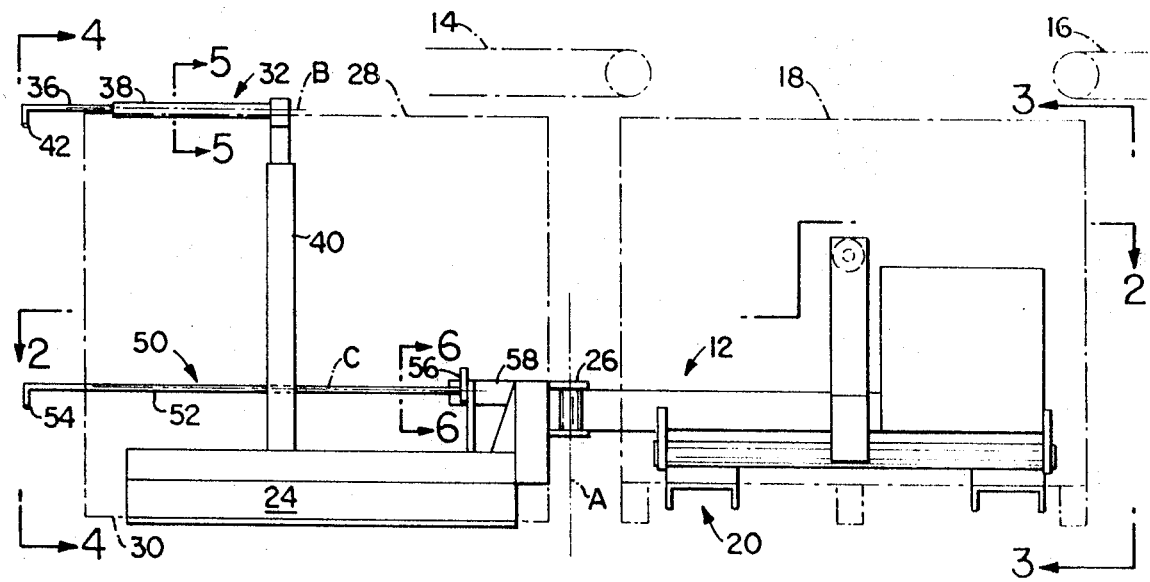
FIG_1
INVENTOR.
PHILIP R. ADRIAN

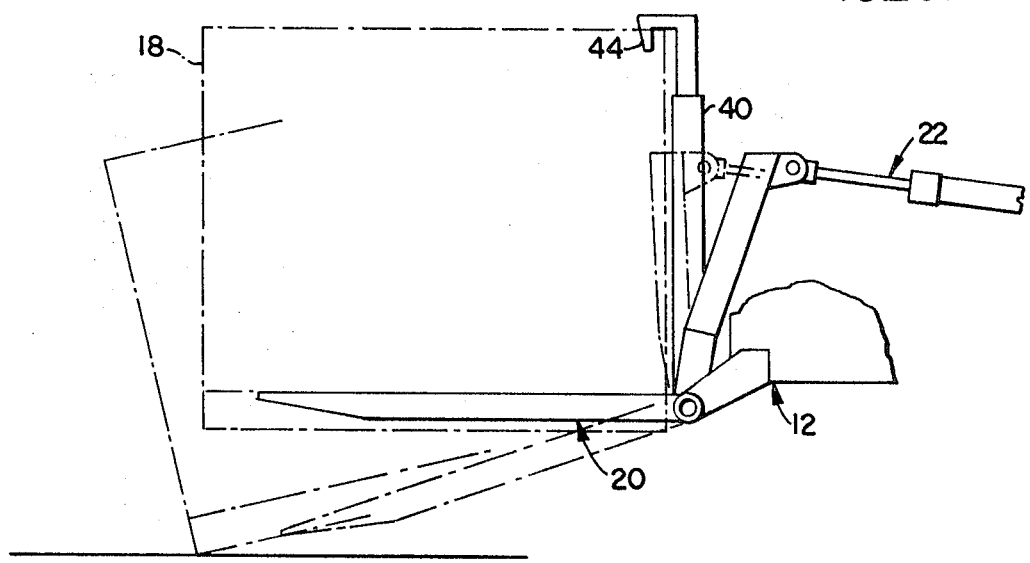
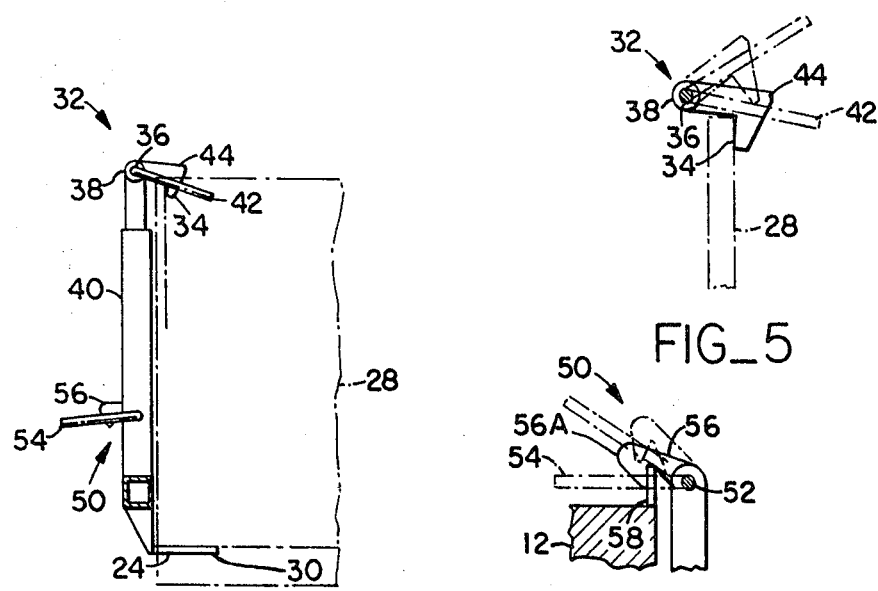

CRATE-HOLDER

BACKGROUND OF THE INVENTION

This invention relates to harvesting machines and, more particularly, to such a machine which carries an extra crate for receiving harvested fruit or the like.

In the harvesting of fruit or the like by a harvesting machine, generally a crate or bin is carried along with the machine and is filled with the fruit. When such crate is filled, it is dropped off at the point where it has become filled, and another crate is put in its place. Since it is not known, of course, just when a crate will become filled, it is not known where in the orchard being harvested another crate will be needed to replace the filled one. Thus, at the point when a crate has become filled, the harvesting operation must stop while another crate is brought to the harvesting machine. This results in a certain amount of time being wasted, and such time lost may be quite great if the replacement crates must be brought a relatively great distance.

It is an object of this invention to provide means for carrying a crate along with a harvesting machine, along with the crate being filled with fruit or the like being harvested.

It is a further object of this invention to provide means which, while fulfilling the above object, is capable of being operated to easily and effectively replace the filled crate with the extra crate being carried along.

SUMMARY OF THE INVENTION

Broadly stated, the inventive apparatus is associated with a vehicle frame for carrying a crate or the like with the vehicle, the apparatus comprising a support frame mounted to the vehicle frame and adapted to support the crate, the support frame being pivotable relative to the vehicle frame from a first position to a second position and back again to the first position, the crate supported thereon moving therewith. Means are included for selectively releasably limiting the movement of the support frame from the first to the second position, release of the selectively releasable limiting means allowing the support frame to be pivoted to the second position.

BRIEF DESCRIPTION OF THE DRAWINGS

These and other objects will become apparent from a study of the following specification and drawings, in which:

FIG. 1 is a side elevation of the inventive crate-holder;
FIG. 2 is a view taken along the line 2—2 of FIG. 1;
FIG. 3 is a view taken along the line 3—3 of FIG. 1;
FIG. 4 is a view taken along the line 4—4 of FIG. 1;
FIG. 5 is a sectional view taken along the line 5—5 of FIG. 1;
FIG. 6 is a sectional view taken along the line 6—6 of FIG. 1.

DESCRIPTION OF THE PREFERRED EMBODIMENT

Shown in FIG. 2 is the rear end of a vehicle 10 having a vehicle frame 12. Such vehicle 10 may be of the type used for harvesting fruit or the like, and may include conveyors, as at 14, 16 (FIG. 1) for conveying the fruit. Such conveyors 14, 16 are positioned to convey fruit into a crate or bin 18 which is supported by a fork 20 at the rear of the vehicle 10. Associated with the fork 20 are hydraulic-actuating means 22 which enable the fork 20 to be raised and lowered, as shown in FIG. 3.

A support frame 24 is pivotally connected along a vertical axis A to vehicle frame 12 by means of hinge 26. The support frame 24 is pivotable relative to the vehicle frame 12 from a first position X to a second position Y, and back again, as shown in FIG. 2. The support frame 24 is configured to support a crate 28 only at a bottom portion 30 along an edge of the crate 28 (FIG. 3). Selectively releasable means 32 are included for holding the top edge 34 of the crate 28 at a point above the bottom portion 30, so that the crate 28 is held by the support frame 24 and selectively releasable top edge holding means 32 in a cantilevered manner. Such selectively releasable means 32 include a shaft 36 which is disposed through a tube 38 fixed to an upright portion 40 extending from support frame 24. Such shaft 36 has formed on one end a handle portion 42 so that the shaft 36 can be rotated about its longitudinal axis B relative to the support frame 24. Fixed to the other end of the shaft 36 is a locking member 44. This locking member 44 (FIG. 5) is configured to cooperate with the top edge 34 of the crate 28 to hold the top edge 34 when the shaft 36 is rotated about its longitudinal axis B to a certain position by means of handle portion 42. The top edge 34 of the crate 28 may be released by rotating the shaft 36 counterclockwise (FIG. 5) to another position. It will be seen that the crate 28, supported on the support frame 24, is movable along with the support frame 24 as it is moved from its first position X to its second position Y and back again.

It will be seen that the selectively releasable means 32 is designed so that the weight of handle portion 42 and locking member 44 tend to keep the locking member 44 in a locking position (FIG. 5). That is, the weights of these members must be overcome in order to release the top edge 34 of crate 28. This means that the crate 28 may be effectively locked in place, and that there is no need for other means to hold it locked in position.

Selectively releasable means 50 are included for limiting the movement of the support frame 24 from the first position X to the second position y. Such selectively releasable means 50 include a shaft 52 passing through upright portion 40 of support frame 24. Such shaft 52 has formed on one end a handle portion 54 so that it can be rotated about its longitudinal axis C relative to the support frame 24. Fixed to the other end of the shaft 52 is a locking member 56, which is configured to cooperate with a bar 58 fixed to the vehicle frame 12. Depending on the position of the shaft 52 about its longitudinal axis C, the locking member 56 acts with bar 58 to limit or allow the movement of the support frame 24 about the axis A from the first position X to the second position Y.

As will be seen in FIG. 6, the weights of handle portion 54 and locking member 56 tend to keep the locking member 56 in a locking position similar to the operation of releasable holding means 32. It will also be seen that the nose 56A of locking member 56 is angled so that lateral force on the nose 56A (as by bar 58 when support frame 24 is pivoted from position Y to position X) moves the locking member 56 upward and allows the support frame 24 to be moved into position X. When the support frame 24 is moved to position X, the weight of the handle portion 54 and locking member 56 move the locking member 56 downward to lock onto bar 58.

In the operation of the device, crate 18 is carried on fork 20, and is filled with fruit by conveyors 14, 16 as the vehicle 10 travels. Crate 28 is supported by support frame 24 and held by locking member 44, and support frame 24 is held in position X (FIG. 2) by locking member 56 coacting with bar 58, all as described above. When crate 18 is filled, the fork 20 is dropped by means of hydraulic-actuating means 22 (FIG. 3). As the vehicle is moved forward, the filled crate 18 drops off. Handle portion 54 is reset to rotate shaft 52 so that locking member 56 no longer limits the movement of support frame 24 from position X to position Y. The crate 28 may then be swung to a position over the fork 20, and after shaft 36 is rotated by means of handle portion 42 to release the top edge 30, crate 28 may be shifted by hand into proper position relative to the fork 20. The hydraulic-actuating means are then actuated to lift the crate 28 up and into proper position to receive fruit from conveyors 14, 16, and carry the crate 28 along with vehicle 10 as it moves.

The use of such carrying structure ensures that little or no time is lost in the substitution of an empty crate for a full one. That is, the harvesting operation may be continued at its normal pace, it not being necessary to wait until an empty crate is found to replace the full one. As the substitute crate 28 is being filled, a workman can take the time to get another empty crate and bring it to the vehicle without an interruption of the harvesting operation. Such crate can then be placed on the support frame 24 and is ready for use upon filling of the crate into which fruit is being conveyed, in the same manner as previously described.

I claim:

1. Apparatus associated with a vehicle frame for carrying a pair of crates or the like along with the vehicle, said apparatus comprising:
   a. crate support frame means mounted to the vehicle frame for supporting one of the crates along only a bottom portion along the edge thereof adjacent the second of said crates, means for pivoting said frame means about a vertical axis relative to the vehicle frame from a first position occupied by said first-mentioned crate to a second position occupied by said second-mentioned crate and back again to the first position, the first-mentioned crate supported thereon moving therewith; and thus into the position previously occupied by said second-mentioned crate when said second-mentioned crate is removed from said vehicle frame;
   b. means for selectively releasably limiting the movement of the crate support frame means from the first to the second position, releasing of the selectively releasable limiting means allowing the crate support frame means to be pivoted to the second position; and
   c. selectively releasable means for holding the top edge of the crate at a point above said bottom portion, so that the crate is held by said support frame means and selectively releasable top edge-holding means in a cantilevered manner.

2. Apparatus according to claim 1 wherein the means for selectively releasably limiting the movement of the crate support frame means from the first to the second position comprises a bar extending from the vehicle frame, a shaft supported by the crate support frame means and rotatable relative thereto about its longitudinal axis, and a locking member adjacent an end of the shaft configured to cooperate with the bar to limit the movement of the crate support frame means from the first position to the second position when the shaft is in one location about its axis of rotation, and to no longer limit the movement of the crate support frame means from the first position to the second position when the shaft is in another location about its axis of rotation.

3. Apparatus according to claim 2 wherein the selectively releasable means for holding the top edge of the crate comprises a second shaft supported by the crate support frame means and rotatable relative thereto about its longitudinal axis, and a locking member fixed to the second shaft and configured to cooperate with the top edge of the crate to hold said top edge when the second shaft is in one location about its axis of rotation, and to no longer hold the top edge of the crate when the second shaft is in another location about its axis of rotation.